US009895021B2

(12) United States Patent
Vega et al.

(10) Patent No.: US 9,895,021 B2
(45) Date of Patent: Feb. 20, 2018

(54) COOKING ASSEMBLY COMPRISING A FLEXIBLE RING CONFORMABLE TO PREDETERMINEDLY SHAPED TEMPLATES OF A COOKING STATION FOR PROVIDING COOKED FOODS WITH PREDETERMINEDLY DIFFERENT SHAPES, AND THE COOKING STATION EMPLOYING THE COOKING ASSEMBLY (71) Applicants: Ignacio Vega, Countryside, IL (US); Bhupendra R. Patel, Carol Stream, IL (US); Scott Paul March, Port Barrington, IL (US)

(72) Inventors: Ignacio Vega, Countryside, IL (US); Bhupendra R. Patel, Carol Stream, IL (US); Scott Paul March, Port Barrington, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 165 days.

(21) Appl. No.: 14/547,762

(22) Filed: Nov. 19, 2014

(65) Prior Publication Data

US 2016/0135641 A1    May 19, 2016

(51) Int. Cl.
A47J 36/16    (2006.01)
A47J 37/06    (2006.01)

(52) U.S. Cl.
CPC ........... *A47J 36/16* (2013.01); *A47J 37/0676* (2013.01)

(58) Field of Classification Search
None
See application file for complete search history.

(56) References Cited

U.S. PATENT DOCUMENTS

| 4,488,479 A | 12/1984 | Sloan et al. | |
|---|---|---|---|
| 4,512,250 A | 4/1985 | Schindler et al. | |
| 5,670,185 A * | 9/1997 | Heck | A21C 3/04 425/133.1 |
| 5,865,104 A * | 2/1999 | Sham | A47J 27/04 126/369.1 |
| 6,217,918 B1 * | 4/2001 | Oh | A23L 1/16 426/241 |

(Continued)

FOREIGN PATENT DOCUMENTS

| FR | 2906122 A1 * | 3/2008 | A21B 3/13 |
|---|---|---|---|
| JP | 2008154943 A * | 7/2008 | |

OTHER PUBLICATIONS

Author unkown, Shamrcok cupcakes, WayBackMachine accessed May 21, 2012, Easy Cake Decorating.*

(Continued)

*Primary Examiner* — David Angwin
*Assistant Examiner* — Spencer h Kirkwood
(74) *Attorney, Agent, or Firm* — Law Offices of Steven W. Weinrieb (57) ABSTRACT A cooking assembly, and a cooking station employing the cooking assembly, is disclosed. The cooking assembly comprises a flexible ring which is conformable to any one of a plurality of different predeterminedly structured templates, any one of which can be interchangeably utilized upon a food station, in order to provide cooked foods with predeterminedly different shapes or configurations as may be desired.

19 Claims, 10 Drawing Sheets (56) References Cited

U.S. PATENT DOCUMENTS

| | | | | |
|---|---|---|---|---|
| 7,180,034 | B1 * | 2/2007 | Oppenheimer | A47J 37/0611 219/386 |
| 2005/0247212 | A1 * | 11/2005 | Meeks | A21B 3/136 99/426 |
| 2009/0255413 | A1 | 10/2009 | Ewald et al. | |

OTHER PUBLICATIONS

Leigh, Shamrock Cupcakes, accessed May 23, 2012, Easy Cake Decorating, p. 1-3.*

Bergeret FR2906122A1 machine translated by EPO.*

* cited by examiner

COOKING ASSEMBLY COMPRISING A FLEXIBLE RING CONFORMABLE TO PREDETERMINEDLY SHAPED TEMPLATES OF A COOKING STATION FOR PROVIDING COOKED FOODS WITH PREDETERMINEDLY DIFFERENT SHAPES, AND THE COOKING STATION EMPLOYING THE COOKING ASSEMBLY

STATEMENT REGARDING FEDERALLY SPONSORED RESEARCH OR DEVELOPMENT

Not Applicable

NAMES OF PARTIES TO JOINT RESEARCH AGREEMENT

Not Applicable

INCORPORATION BY REFERENCE OF MATERIAL SUBMITTED ON A COMPACT DISC

Not Applicable

FIELD OF THE INVENTION

The present invention relates generally to cookware, more particularly, to a cooking assembly and a cooking station employing the cooking assembly, and still more particularly to a new and improved cooking assembly comprising a flexible ring which is conformable to any one of a plurality of different predeterminedly structured templates, any one of which can be interchangeably utilized upon a food station, in order to provide cooked foods with predeterminedly different shapes or configurations as may be desired, and the cooking station employing the cooking assembly.

BACKGROUND OF THE INVENTION

Conventional food cooking stations, such as, for example, egg or similar cooking stations, conventionally employed within fast-food establishments for forming eggs or pancakes for various breakfast food items, normally comprise fixed templates integrally formed within the cooking surfaces of the egg or similar cooking stations. These fixed templates may define, for example, circular-shaped recesses into which raw eggs or pancake batter are deposited. The eggs or batter are then cooked to the desired degree and withdrawn from the templates whereby, for example, the eggs will comprise perfectly rounded cooked eggs, ideal for deposition atop an English muffin, bagel, or the like, or similarly shaped pancakes, so as to serve as a desirable breakfast food item. The operational drawback with the use of such cooking stations resides in the fact that the recesses, into which the raw eggs or pancake batter is deposited for cooking, are fixedly formed as integral parts of the fixed templates, and the templates, in turn, comprise fixed integral parts of the food station. Hence, such cooking stations only permit one predetermined configuration or shape to be achieved for the end use food product, however, different food establishments may desire differently formed or shaped food products for their different breakfast food items, or a particular food establishment may desire differently shaped or configured food products for its multiple food items, such as, for example, differently shaped or configured food items for different food items comprising its breakfast menu, or differently shaped or configured food items for different food items comprising its lunch menu, and/or differently shaped or configured food items comprising its dinner menu. Obviously, it can be readily appreciated that with such conventional cooking stations, a particular food establishment, or different food establishments, would have to invest substantial funds to purchase multiple cooking stations, having the differently shaped templates integrally incorporated therein, so as to be capable of producing differently shaped end use cooked food items.

A need therefore exists for new and improved cooking station apparatus that can provide food cooking stations with the desired flexibility, whereby predeterminedly different shapes can be imparted to the end-use cooked food items as may be desired, while only requiring the use of a single cooking station.

SUMMARY OF THE INVENTION

The foregoing and other objectives are achieved in accordance with the teachings and principles of the present invention through the provision of a new and improved cooking station which has operatively associated therewith a plurality of food cooking template racks, plates, or sheets which have hollow or open regions defining different predeterminedly fixed shapes or configurations integrally incorporated or formed therein. A flexible ring, having axially spaced upper and lower sets of circumferentially extending and circumferentially spaced teeth, or alternatively, flat planar regions defined within external wall portions of the flexible ring and circumferentially spaced by substantially 90° from each other, is provided for use in conjunction with any one of the plurality of food cooking template racks, plates, or sheets. As a result of the flexibility of the flexible ring, which is a function of the material from which the flexible ring is fabricated, the flexible ring will conform to the periphery of the interior wall portions of the particular template rack, plate, or sheet having the hollow or open regions defined therein. In addition, the solid portions of the template rack, plate, or sheet will effectively be seated within the circumferentially extending groove or track of the flexible ring that is defined between the upper and lower sets of circumferentially extending and circumferentially spaced teeth of the flexible ring, or within the aforenoted flat planar portions defined within the external peripheral surface of the flexible ring.

It is to be noted that the weight of the template rack, plate, or sheet, effectively bearing upon the flexible ring as a result of its trapped confinement within the circumferential track or groove, or the planar regions, of the flexible ring, effectively forces the lower edge portion of the flexible ring into sealing contact with the underlying hot plate, platen, or griddle portion of the cooking station upon which the egg product or pancake batter is cooked. In this manner, the lower edge solid portion of the flexible ring, in the embodiment having the planar regions defined within the outer peripheral portion of the flexible ring, or from which the lower set of circumferentially extending and circumferentially spaced teeth extend radially outwardly, effectively defines a fluid-tight seal with the under-lying hot plate, platen, or griddle of the cooking station such that the eggs or pan-cake batter cannot leave or escape from the hollow or open regions of the template plate or sheet, while substantially the entire axially extending and upstanding internal peripheral wall structure of the flexible ring serves to confine the eggs or pan-cake batter and thereby shape or configure the end use cooked food product. Accordingly, it can be readily appreciated further that a single flexible ring can be interchangeably utilized with a plurality of different template racks, plates, or sheets, having predetermined differently shaped open or hollow regions formed therein, upon a single food cooking station, so as achieve end use cooked food products having different predeterminedly desired shapes or configurations.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 4 is a top perspective view of a cooking station having a template rack, plate, or sheet pivotally and removably mounted thereon, wherein a flexible ring, similar to the flexible rings illustrated within FIG. 1-2, is disposed within each one of the hollow or open portions of the template rack, plate, or sheet so as to accommodate, for example, eggs, pancake batter, or the like, such that the end use cooked food product has a predeterminedly desired shape or configuration as determined by means of the template rack, plate, or sheet and the flexible ring disposed therewithin;

FIG. 16 is a front perspective view, similar to that of FIG. 4, of a second embodiment cooking station having a template rack, plate, or sheet pivotally and removably mounted thereon, wherein a flexible ring, such as the flexible ring illustrated within FIGS. 12-15, is disposed within each one of the hollow or open portions of the template rack, plate, or sheet so as to accommodate, for example, eggs, pancake batter, or the like, such that the end use cooked food product has a predeterminedly desired shape or configuration as determined by means of the template rack, plate, or sheet and the flexible ring disposed therewithin, the template rack, plate, or sheet, and the flexible rings disposed therein, being disposed at the raised position such that the end use cooked food products are disposed upon the cooking station hot plate, platen, or griddle portion ready to be removed therefrom by means of a suitable implement such as, for example, a spatula.

DETAILED DESCRIPTION OF THE ILLUSTRATED EMBODIMENTS

Figure 1:
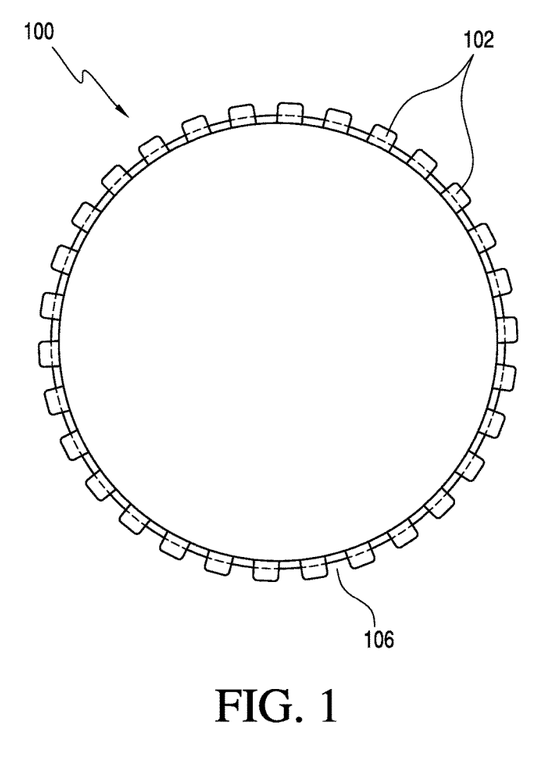
FIG. 1 is a schematic plan view of a first embodiment of a new and improved flexible ring to be utilized in conjunction with a selected one of a plurality of template racks, plates, or sheets which are pivotally and removably mounted up-on a cooking station in order to provide end use cooked food items with a predetermined shape or configuration.
Figure 2:
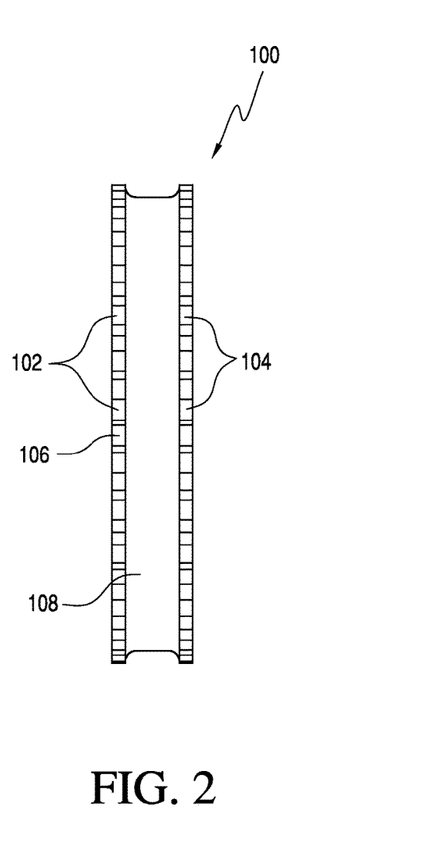
FIG. 2 is a schematic side elevational view of the flexible ring illustrated within FIG. 1 wherein the two sets of axially spaced, circumferentially extending and circumferentially spaced teeth of the flexible ring are shown, and wherein further, the circumferentially extending annular track or groove, for accommodating solid portions of the template rack, plate, or sheet, is also shown.

Referring now to the drawings, and more particularly to FIGS. 1 and 2 thereof, a first embodiment of a flexible ring, which is adapted to be used in conjunction with a selected one of a plurality of template racks, plates, or sheets which are pivotally and removably mounted upon a cooking station in order to provide end use cooked food items with a predetermined shape or configuration, as will be more fully appreciated hereinafter, is disclosed and is generally indicated by the reference character 100. More particularly, it is seen that the flexible ring 100 has a substantially circular configuration, however, it is to be realized that the flexible ring 100, which may be fabricated from a suitable material, such as, for example, polytetrafluoroethylene (PTFE), one example of which is TEFLON®, having stainless steel powder mixed therein, may be readily deformed when placed within a predeterminedly shaped or configured template whereby the flexible ring 100 will then assume the shape or configuration defined by means of the side walls forming the particularly shaped or configured template. The flexible ring may of course be fabricated so as to have any one of a plurality of different sizes, but as exemplified herein, the flexible ring 100 is seen to have a diametrical extent of approximately four inches (4.00") and has a thickness or axial height dimension of approximately three quarters of an inch (0.75"). Still further, in accordance with this first embodiment flexible ring 100, and as can be readily appreciated from FIG. 1, it is seen that the flexible ring 100 is provided with two sets of axially spaced, and circumferentially spaced, first and second upper and lower teeth or protrusions 102,104 projecting radially outwardly from external surface portions of the flexible ring 100. Each set of teeth or protrusions 102, 104 comprises thirty (30) teeth with each tooth covering an angular extent of approximately six degrees (6°), while each space 106 defined between each pair of adjacent teeth or protrusions 102,104 likewise covers an angular extent of approximately six degrees (6°). It is noted that the upper teeth or protrusions 102 are also axially aligned with the teeth or protrusions 104 comprising the second lower set of teeth. A circumferentially extending annular track or groove 108 is defined between the two sets of upper and lower teeth or protrusions 102,104 for a purpose which will be disclosed hereinafter.

Figure 3:
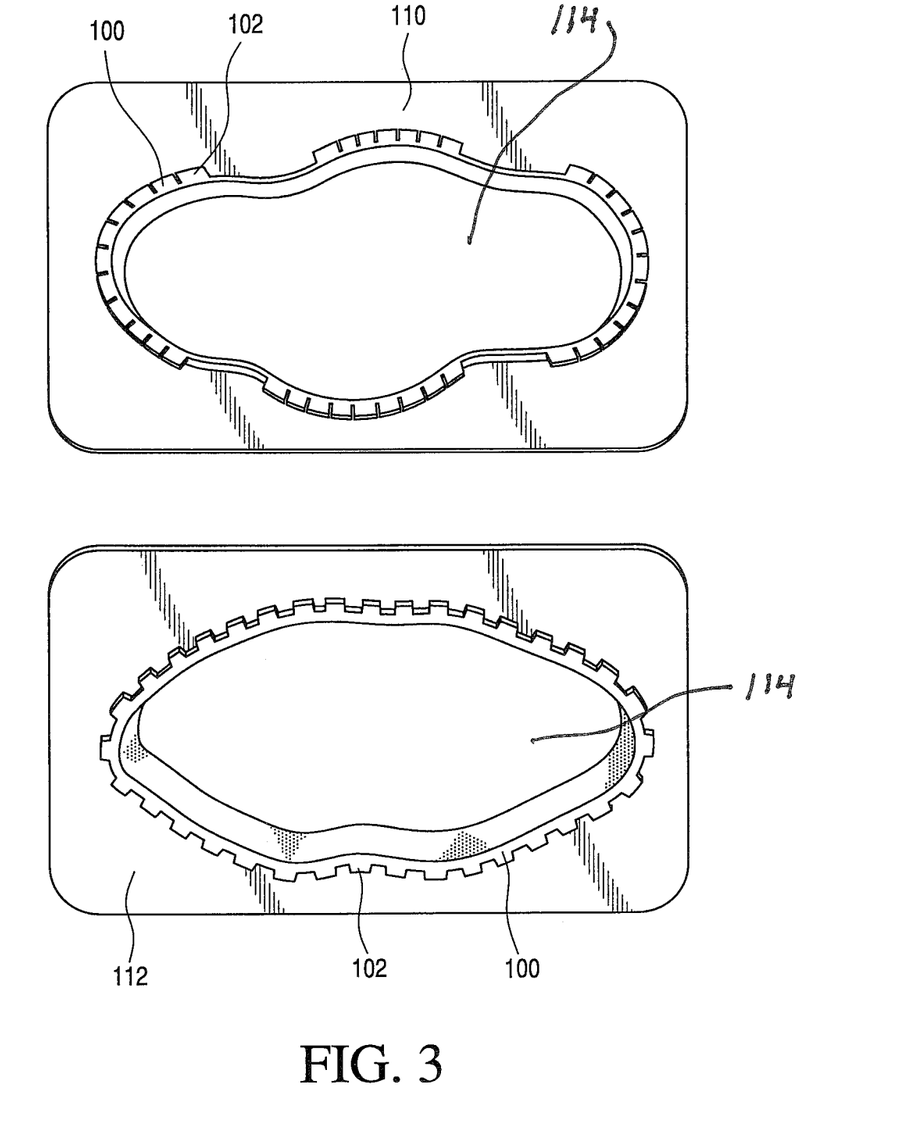
FIG. 3 is a plan view showing a pair of template stampings which are respectively provided with differently shaped hollow portions within which a flexible ring, similar to the flexible ring illustrated within FIGS. 1-2, has been inserted so as to achieve end use cooked food products with predeterminedly desired shapes or configurations corresponding to those shapes or configurations of the template stampings.

With reference now being made to FIG. 3, there is disclosed a pair of first and second template stampings 110,112 which are respectively provided with differently shaped hollow portions, open regions, or through-openings 114 within which a flexible ring, similar to the flexible ring illustrated within FIGS. 1-2, can be inserted whereby, due to the inherent flexibility of the flexible ring 100, the flexible ring 100 will assume the predetermined shape, contour, or configuration of the internal sidewall portions of the template stampings 110,112 which define the through-openings 114. While the template stampings 110,112 have substantially elliptical shapes, contours, or configurations, it is to be noted that different or other shapes, contours, or configurations can be predetermined provided within the template stampings 110,112, such as, for example, circular-shaped hollow portions or through-openings, triangular-shaped hollow portions or through-openings, square or rectangular-shaped hollow portions or through-openings, diamond-shaped hollow portions or through-openings, or the like.

As will be further appreciated hereinafter, the template stampings 110,112 can effectively comprise stamped-out portions of a cooking station template rack, plate, or sheet within which a multitude of such template stampings are formed so as to enable a cooking establishment to simultaneously cook a multitude of food product items having predetermined contours, shapes, or configurations. An exemplary cooking station is illustrated within FIG. 4 and is generally indicated by the reference character 200. The cooking station 200 comprises a framework which is seen to comprise a base section 202 upon the upper surface of which there is provided a hot plate, platen, or griddle 204 upon which the food item products are actually cooked. A template rack, plate, or sheet 206 is pivotally mounted within the framework of the cooking station 200, by means of suitable pivot or hinge structure 208, so as to be movable between a lowered position, as illustrated within FIG. 4, and a raised position as illustrated within FIG. 5. As can readily be seen from FIG. 4, the template rack, plate, or sheet 206 is provided with a multitude of hollow stamped-out template regions, similar to the stamped templates 110,112 of FIG. 3, however, in this case, the template rack, plate, or sheet 206 is provided with, for example, eight (8) template stampings. It is noted that all of the template stampings defined within a particular template rack, plate, or sheet 206 have the same predetermined shape, contour, or configuration such that when food items are to be prepared, the resulting food item products all have substantially the same predetermined shape, contour, or configuration as defined by means of the template stampings within that particular term-plate rack, plate, or sheet 206. Such completed or cooked food item products are disclosed at 209 within FIG. 5.

It is to be noted that each template rack, plate, or sheet 206, in addition to being pivotally mounted upon the cooking station 200, by means of the aforenoted hinge or pivot structure 208, is also readily removable from the cooking station 200 by means of suitable structure, not shown, incorporated, for example, within the pivot or hinge structure 208. In this manner, different template racks, plates, or sheets 206, having different predetermined template stampings comprising different shapes, contours, or configurations defined therein, may be readily interchanged with other template racks, plates, or sheets, depending upon the desired shape, contour, or configuration desired for the end use food product item. A handle 210 is integrally attached to the template rack, plate, or sheet 206 in order to facilitate the movement of the template rack, plate, or sheet 206 between its lowered and raised positions. It can be further seen from FIG. 4 that one of the flexible rings 100 has been inserted into each one of the hollow stamped-out template regions of the template rack, plate, or sheet 206 so as to engage and conform to the upstanding internal wall portions of the template rack, plate, or sheet 206 which define each one of the hollow stamped-out template regions. In this manner, the flexible rings 100, disposed within the hollow stamped-out template regions of the template rack, plate, or sheet 206 effectively define mold cavities within which the food items are to be cooked. It is to be especially noted at this juncture that the first upper set of circumferentially spaced teeth or protrusions 102 are disposed above the plane of the template rack, plate, or sheet 206, while the second lower set of circumferentially spaced teeth or protrusions 104 are disposed beneath the plane of the template rack, plate, or sheet 206, although such lower set of circumferentially spaced teeth or protrusions 104 are not visible in FIG. 4. In addition, it can be further appreciated that the solid residual portions of the template, rack, plate, or sheet 206, which surround the hollow stamped-out template regions of the template rack, plate, or sheet 206, are disposed within the circumferentially extending annular groove or track 108 of each flexible ring 100. In this manner, the template rack, plate, or sheet 206 is effectively trapped or secured between the first upper and second lower circumferentially extending teeth or protrusions 102,104 of the multitude of flexible rings 100. Still further, it is to be additionally noted that the weight of the template rack, plate, or sheet 206 effectively causes the lower end portions of the second lower circumferentially extending teeth or protrusions 104 to tightly engage and seal the interface defined between the lower end portions of the second lower circumferentially extending teeth or protrusions 104 and the upper surface portion of the cooking station hot plate, platen, or griddle 204 such that liquid food products, such as, for example, eggs, pancake batter, and the like, once poured into each one of the mold cavities defined by means of the flexible rings disposed within the hollow stamped-out template regions of the template rack, plate, or sheet 206, will not leak or ooze out from such cavities or molds, thereby providing the end use cooked food items with the final desired shapes, contours, or configurations as illustrated within FIG. 5. Once the food product items 209 are cooked, the template rack, plate, or sheet 206 can be moved to its raised position, by means of the handle 210, such that the cooked food product items 209 remain upon the cooking station hot plate, platen, or griddle 204, as illustrated within FIG. 5, whereby the same may be removed by operator personnel using, for example, a spatula or the like. It is also to be noted that the fabrication of the flexible rings 100 from polytetrafluoroethylene facilitates the easy separation of the cooked food products from the flexible rings 100.

Figure 4:
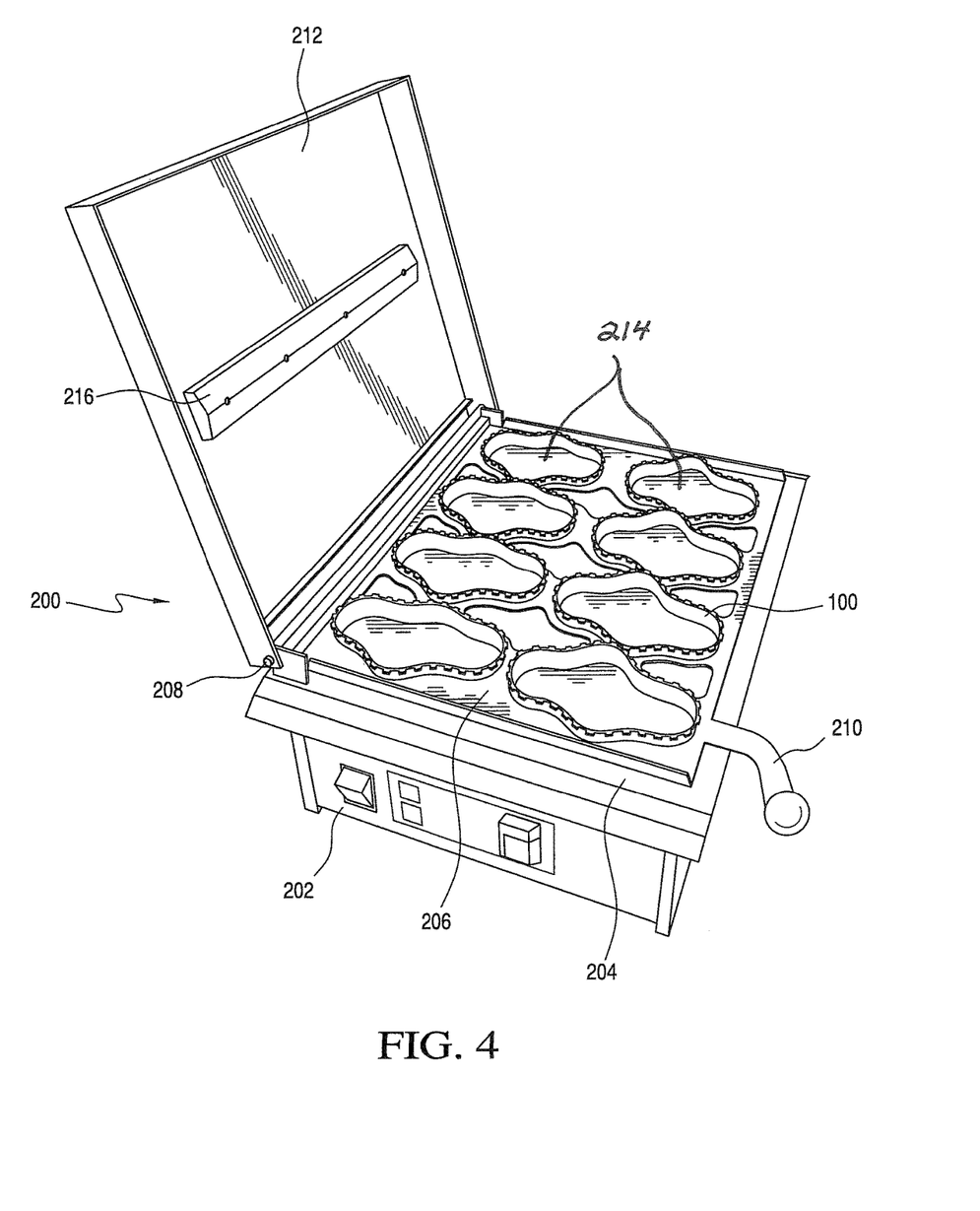
Figure 5:
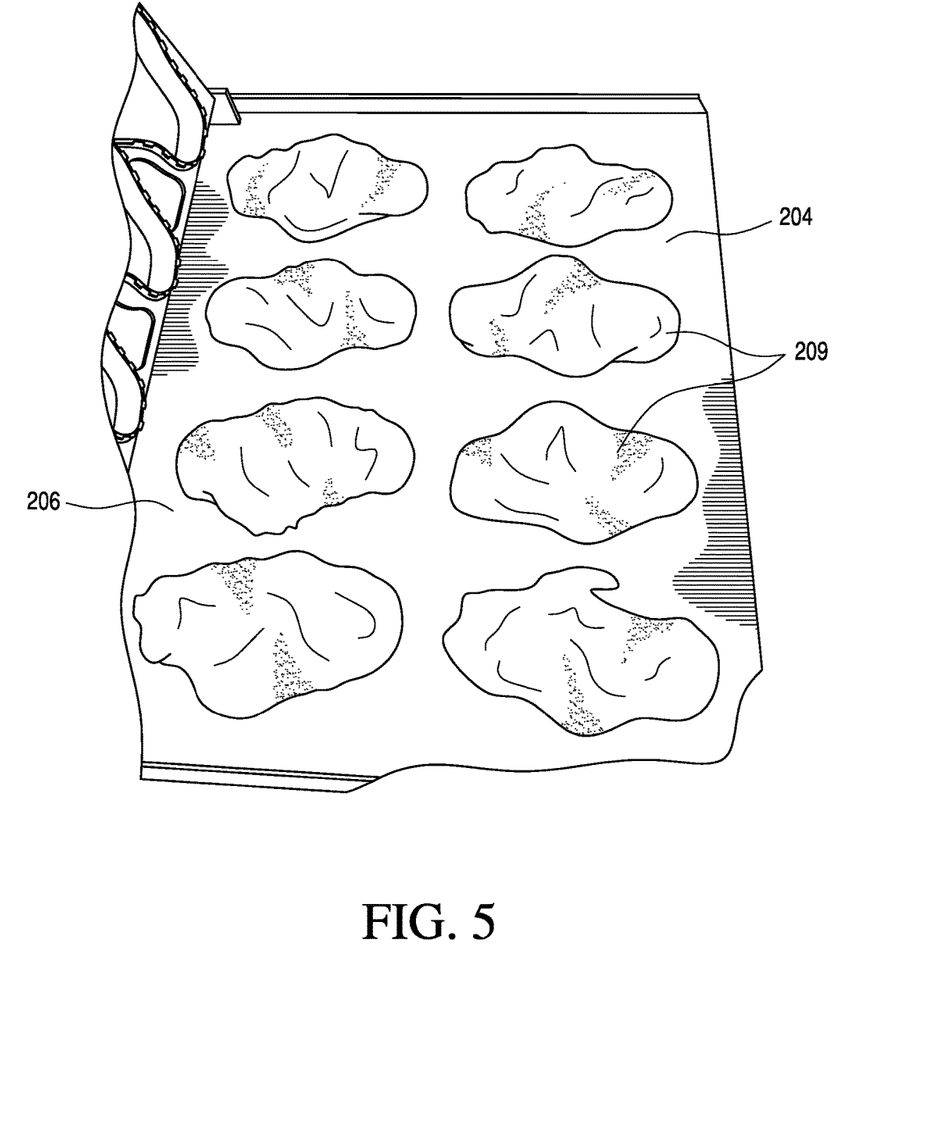
FIG. 5 is a top perspective view of the cooking station illustrating the hot plate, platen, or griddle portion thereof upon which, for example, the eggs, pancakes, or the like, have been cooked, the template rack, plate, or sheet having been moved pivotally upwardly such that the end use cooked food products or items, now disposed upon the hot plate, platen, or griddle portion of the cooking station, can now be easily removed from the cooking station hot plate, platen, or griddle by means of a spatula.
Figure 6:
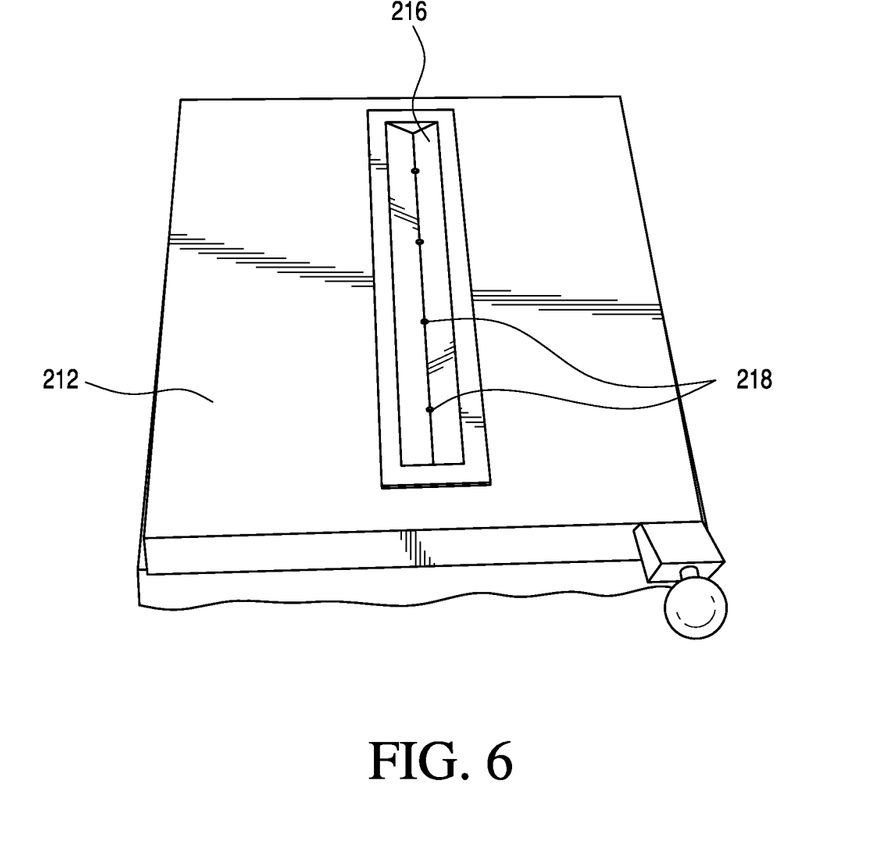
FIG. 6 is a top perspective view of the cooking station when the cover of the cooking station is disposed at its CLOSED position, wherein it can be readily seen that the cover of the cooking station comprises an elongated trough defined therein, the bottom surface portion of the trough also being visible within FIG. 4, the trough being used to collect water which then seeps or drips through spaced holes defined within the central bottom portion of the trough so as to be flashed into steam internally within the cooking station.

Continuing further, and with reference now being made to FIGS. 4 and 6, it is further seen that the cooking station 200 further comprises a cover 212 which is pivotally mounted upon the cooking station by means of suitable hinge or pivot structure 214 so as to be movable between a first lowered position so as to cover the cooking station while food product items are being cooked, and a second raised position so as to permit the mold cavities of the template rack, plate, or sheet 204 to be filled with liquid food product such as, for example, eggs, pancake batter, or the like. As can best be seen from FIGS. 4 and 6, an elongated water trough 216, having a substantially V-shaped cross-sectional configuration, is provided within the central portion of the cover 212. A plurality of longitudinally spaced weep holes, or water seep holes, 218 are provided within the bottom of the water trough 216. Accordingly while the food products are being cooked, and while the cover 212 is disposed at its closed position atop the cooking station 200, a relatively small amount of water may be deposited within the trough 216 whereby smaller amounts of water droplets will effectively flow through the weep or seep holes 218 so as to be exposed to the elevated temperature environment disposed internally of the enclosed cooking station 200. Some of the water will tend to find its way to the hot plate, platen, or griddle 204 of the cooking station 200, while some of the water will be flashed into steam due to encountering the elevated temperature environment present within the enclosed elevated temperature environment of the cooking station 200. In either instance, the steam developed by such water droplets will tend to assist in the cooking of the upper portions of the food product items 209.

Figure 7:
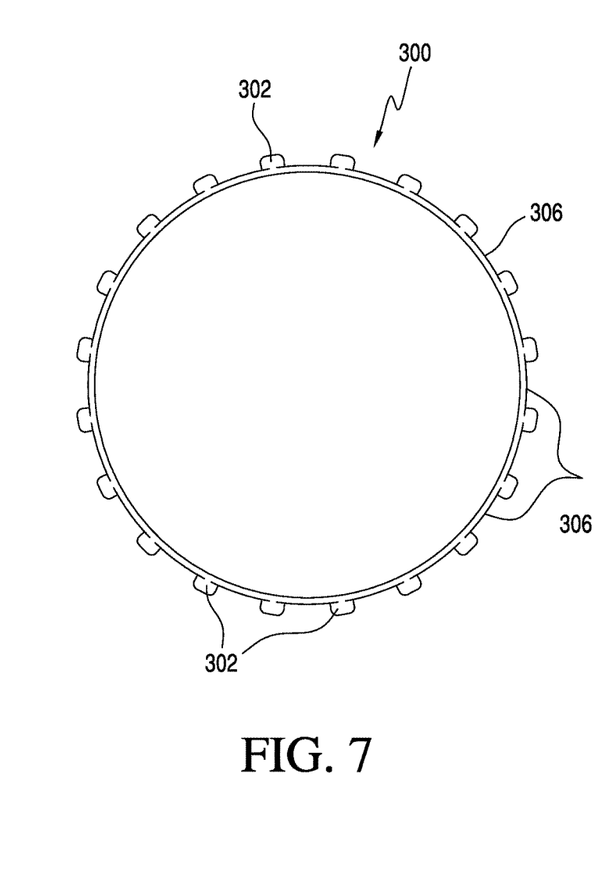
FIG. 7 is a schematic plan view, similar to that of FIG. 1, showing, however, a second embodiment of a new and improved flexible ring to be utilized in conjunction with a selected one of a plurality of template racks, plates, or sheets which are pivotally and removably mounted upon a cooking station in order to provide end use cooked food items with a predetermined shape or configuration.
Figure 8:
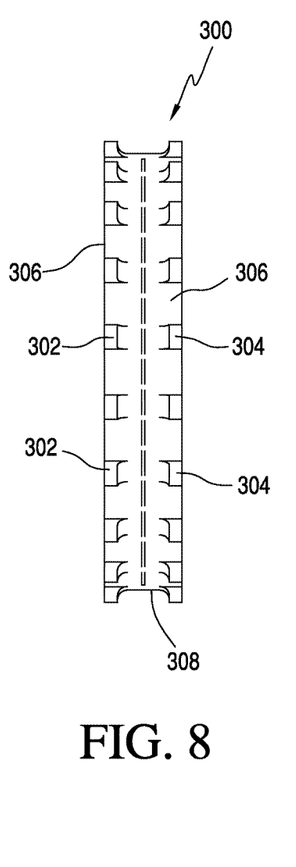
FIG. 8 is a schematic side elevational view, similar to that of FIG. 2, showing, however, the second embodiment flexible ring illustrated within FIG. 7 wherein the two sets of axially spaced, circumferentially extending and circumferentially spaced teeth of the flexible ring are shown, and wherein further, the circumferentially extending annular track or groove, for accommodating solid portions of the template rack, plate, or sheet, is also shown.
Figure 9:
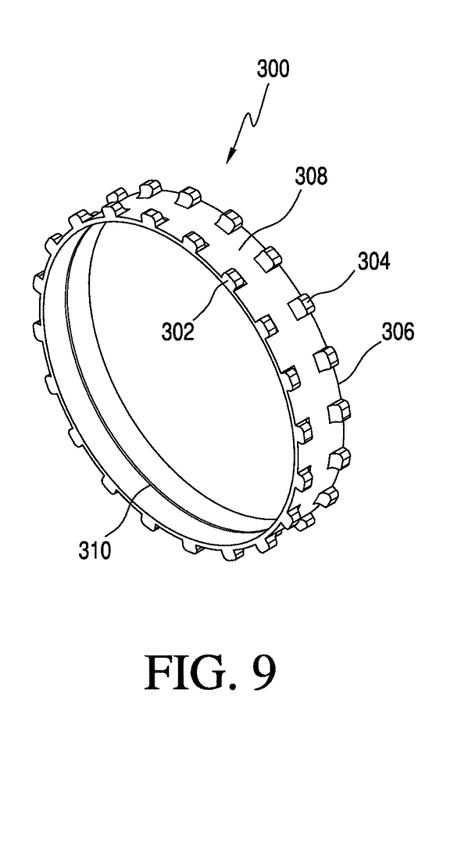
FIG. 9 is a perspective view of the new and improved second embodiment flexible ring as illustrated within FIGS. 7 and 8.
Figure 10A:
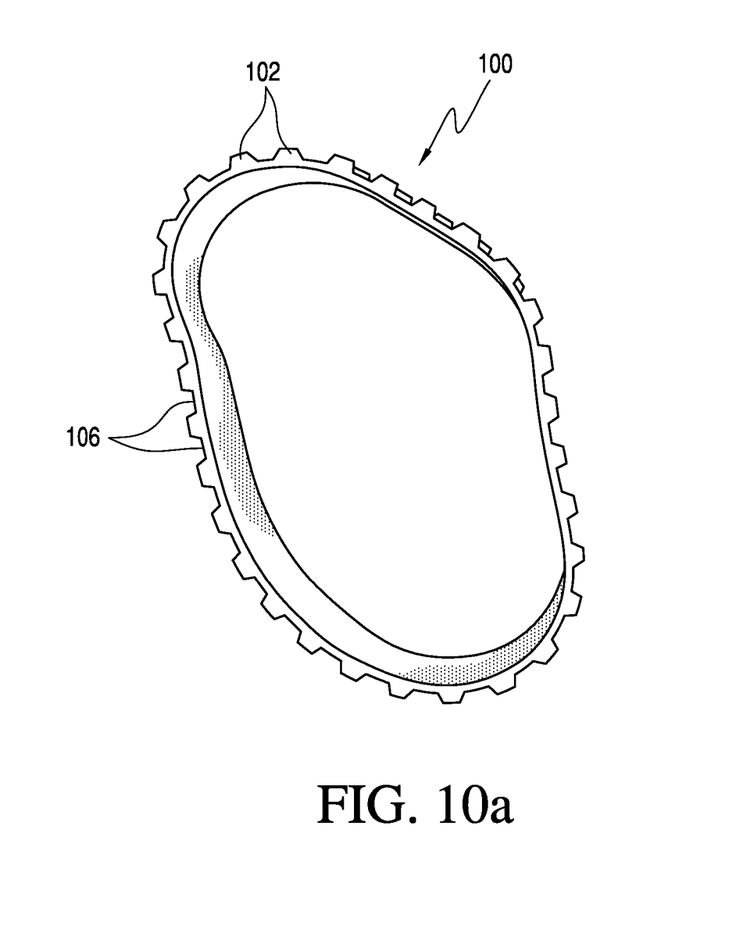
FIGS. 10a and 10b are perspective views of the first and second embodiment flexible ring members shown side-by-side so as to appreciate the structural differences between the first and second embodiments of the flexible ring.
Figure 10B:
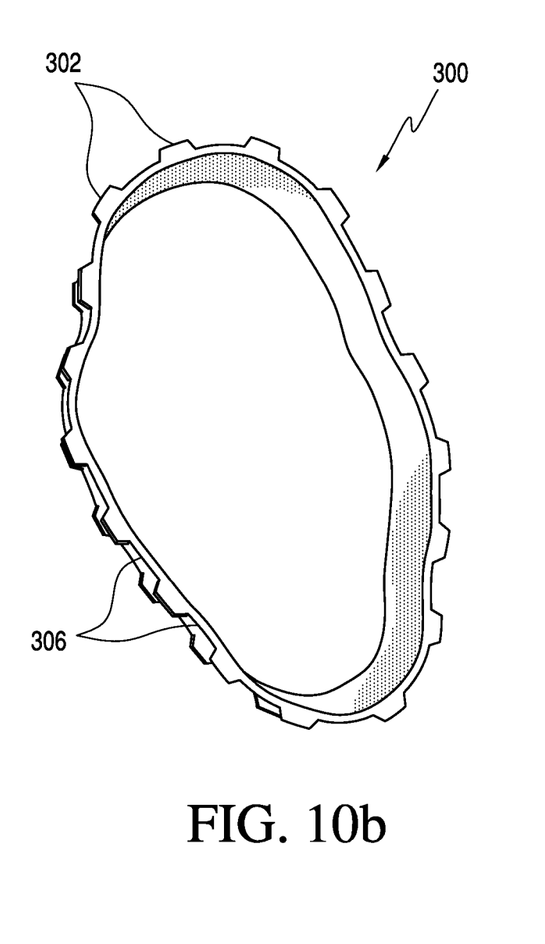
Figure 11A:
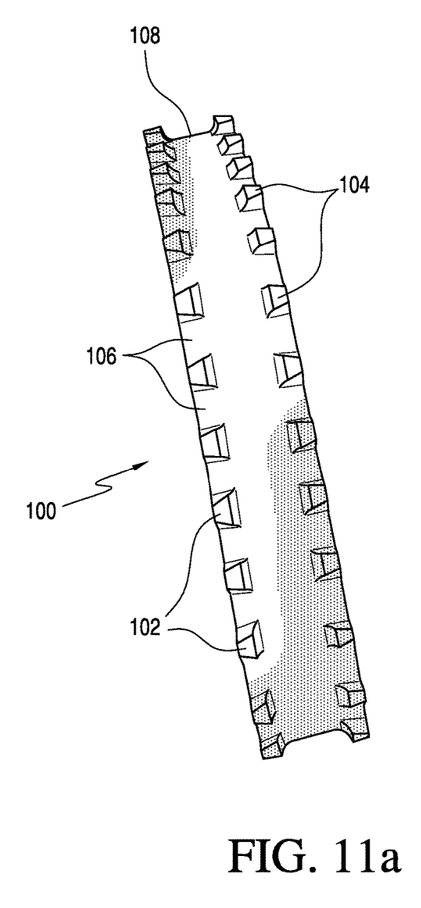
FIGS. 11a and 11b are effectively side elevational views of the first and second embodiment flexible ring members shown side-by-side so as to additionally appreciate the structural differences between the first and second embodiment flexible rings.
Figure 11B:
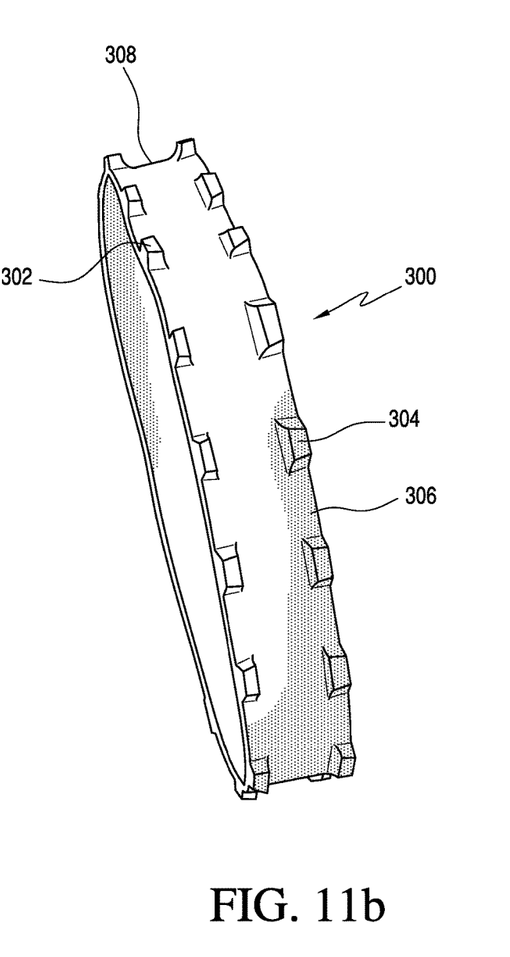

With reference now being made to FIGS. 7-9, a second embodiment of a flexible ring, which is similar to the first embodiment flexible ring 100 and is therefore likewise adapted to be used in conjunction with a selected one of a plurality of template racks, plates, or sheets which are pivotally and removably mounted upon a cooking station in order to provide end use cooked food items with a predetermined shape or configuration, is disclosed and is generally indicated by the reference character 200. It is to be noted that component parts of the second embodiment flexible ring 300, which correspond to similar parts of the first embodiment flexible ring 100, will be designated by corresponding reference characters except that they will be within the 300 series. Accordingly, it can be seen, for example, that the second embodiment flexible ring 300, as was the case with the first embodiment flexible ring 100, has a substantially circular configuration, however, again, it is to be realized that the flexible ring 300, which may be fabricated from a suitable material, such as, for example, polytetrafluoroethylene (PTFE) having stainless steel powder mixed therein, may be readily deformed when placed within a predeterminedly shaped or configured template whereby the flexible ring 300 will then assume and conform to the shape or configuration defined by means of the side walls forming the particularly shaped or configured template. The flexible ring may of course be fabricated so as to have any one of a plurality of different sizes, but as exemplified herein, the flexible ring 300 is seen to have a diametrical extent of approximately four inches (4.00") and has a thickness or axial height dimension of approximately three quarters of an inch (0.75"). Still further, this second embodiment flexible ring 300, as can be readily appreciated from FIGS. 7-9, is provided with two sets of axially spaced, and circumferentially spaced, radially outwardly projecting first and second upper and lower teeth or protrusions 302,304, however, unlike the first embodiment flexible ring 100 and the upper and lower sets of teeth or protrusions 102,104 of the same, one of the differences between the first embodiment flexible ring 100 and the second embodiment flexible ring resides in the fact that each set of teeth 302,304 of the second embodiment flexible ring 300 only comprises twenty (20) teeth with each tooth covering an angular extent of approximately six degrees (6°), while each space 306 defined between each pair of adjacent teeth or protrusions 302,304 covers an angular extent of approximately twelve degrees (12°). In this manner, it has been found that easier and more efficient cleaning of the second embodiment flexible ring 300 can be substantially enhanced.

Similar to the first embodiment flexible ring 100, the teeth or protrusions 302, comprising, for example, the first upper set of teeth of the second embodiment flexible ring 300, are axially aligned with the teeth or protrusions 304 comprising the second lower set of teeth or protrusions of the second embodiment flexible ring, and in addition, the second embodiment flexible ring 300 also has a circumferentially extending annular track or groove 308 defined between the first upper and second lower teeth or protrusions 302,304 for the same purpose that the circumferentially extending annular track or groove 108 was provided upon the first embodiment flexible ring 100. However, a second difference between the first embodiment flexible ring 100 and the second embodiment flexible ring 300 resides in the fact that the second embodiment flexible ring 300 also has an annular scribe line 310 defined and visible upon the internal circumferentially extending side wall of the flexible ring 300. The purpose of this scribe line 310 is to assist operator personnel, when filling the aforenoted food cavities or molds with food product to be cooked, such that the proper amount of food product can be poured into the food cavities or molds in order to obtain the desirable proper end use cooked food product. The aforenoted differences can also be seen and appreciated with additional reference being made to FIGS. 10*a*,10*b*,11*a*,11*b* wherein the first and second embodiment flexible rings 100,300 are effectively disposed in a side-by-side relationship.

Lastly, with reference now being made to FIGS. 12-15, a third embodiment of a flexible ring, which is similar to the first and second embodiment flexible rings 100,300 and is therefore likewise adapted to be used in conjunction with a selected one of a plurality of template racks, plates, or sheets which are pivotally and removably mounted upon a cooking station in order to provide end use cooked food items with a predetermined shape or configuration, is disclosed and is generally indicated by the reference character 400. It is to be noted that component parts of the third embodiment flexible ring 400, which correspond to similar parts of the first and second embodiment flexible rings 100,300 will be designated by corresponding reference characters except that they will be within the 400 series. Accordingly, it can be seen and appreciated, for example, that while the third embodiment flexible ring 400, unlike the first and second embodiment flexible rings 100,300 which had substantially circular configurations, has a substantially elliptical configuration, it is to be realized that the third embodiment flexible ring 400, which may likewise be fabricated from a suitable material, such as, for example, polytetrafluoroethylene (PTFE) having stainless steel powder mixed therein, may nevertheless be readily deformed when placed within a predeterminedly shaped or configured template whereby the flexible ring 400 will then assume and conform to the shape or configuration defined by means of the side walls forming the particularly shaped or configured template. The flexible ring may of course be fabricated so as to have any one of a plurality of different sizes, but as exemplified herein, the flexible ring 400 is seen to have a longitudinal length dimension L of approximately five and one half inches (5.54"), a width dimension W of approximately three and one quarter inches (3.28"), and a thickness or axial height dimension H of approximately three quarters of an inch (0.75").

Figure 12:
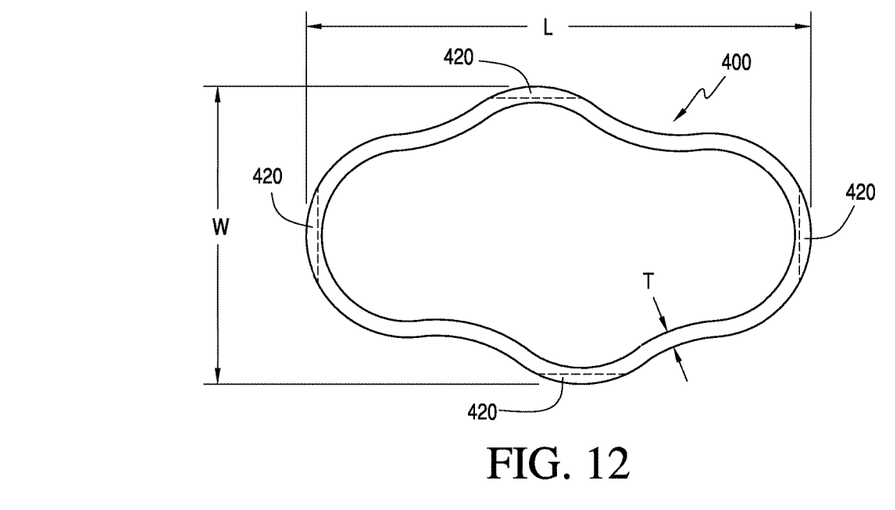
FIG. 12 is a schematic plan view, similar to that of FIGS. 1 and 7, showing, however, a third embodiment of a new and improved flexible ring to be utilized in conjunction with a selected one of a plurality of template racks, plates, or sheets which are pivotally and removably mounted upon a cooking station in order to provide end use cooked food items with a predetermined shape or configuration.
Figures 13, 14:
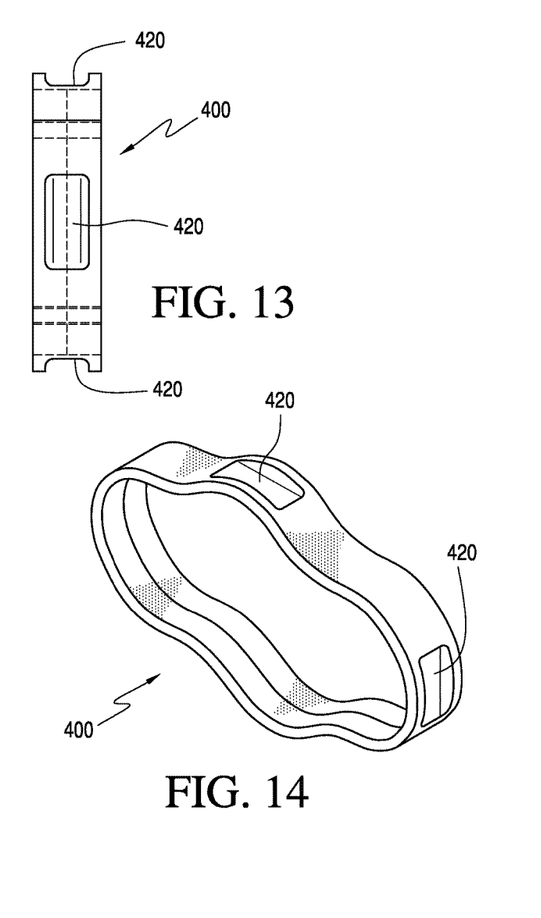
FIG. 13 is a schematic end elevational view, similar to that of FIGS. 2 and 8, showing, however, the third embodiment flexible ring illustrated within FIG. 12 wherein one of the flat planar regions, defined within the outer peripheral surface of the flexible ring for accommodating solid portions of the template rack, plate, or sheet, is illustrated.
FIG. 14 is a perspective view of the new and improved third embodiment flexible ring as illustrated within FIGS. 12 and 13.
Figure 15:
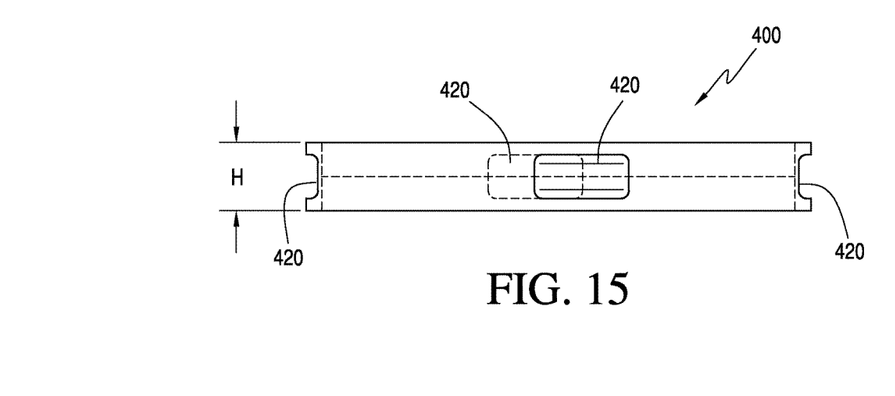
FIG. 15 is a schematic side elevational view of the new and improved third embodiment flexible ring as illustrated within FIGS. 12-14.
Figure 16:
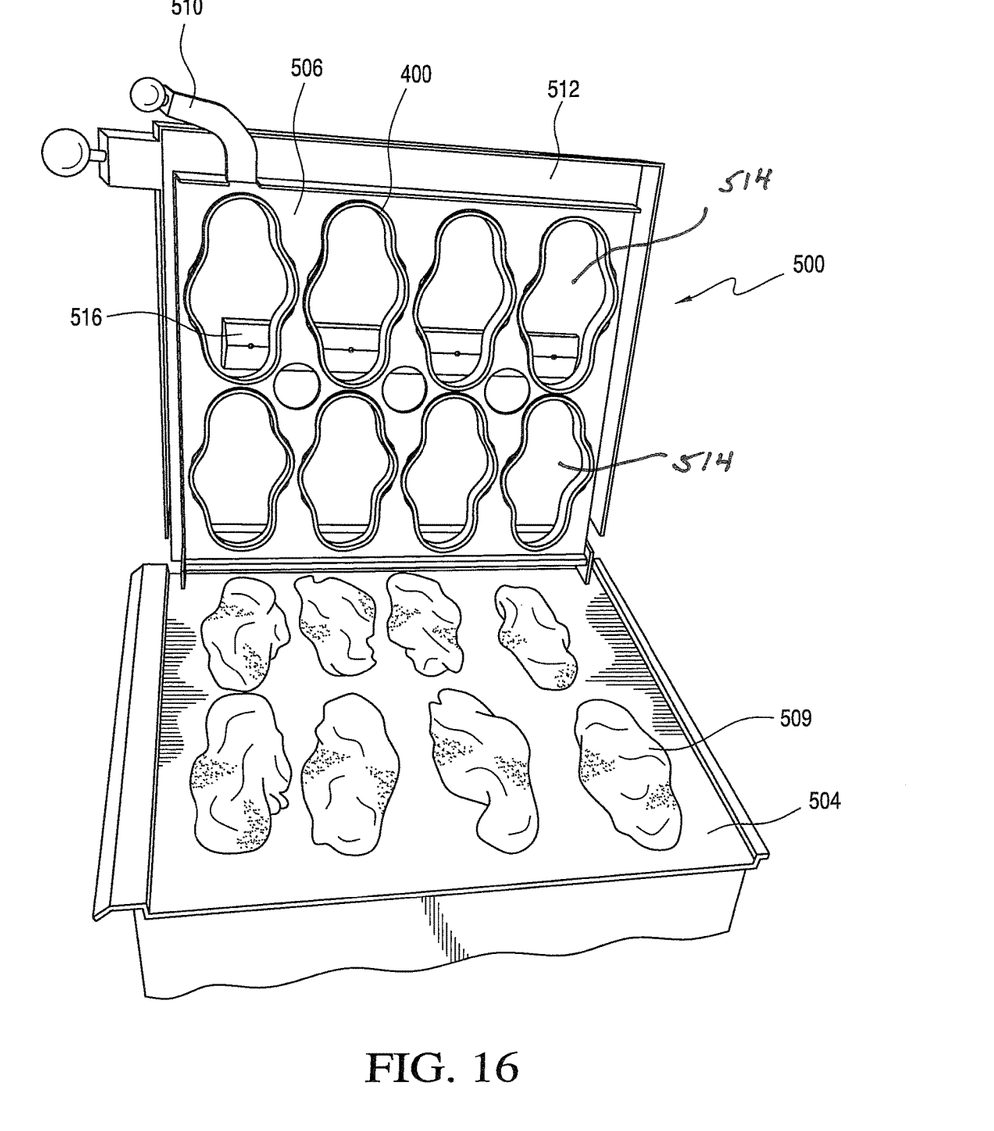

Still further, this third embodiment flexible ring 400, as can be readily appreciated from FIGS. 12-15, is significantly differentiated from the first and second embodiment flexible rings 100,300 in that in lieu of the two sets of axially spaced, and circumferentially spaced, radially outwardly projecting first and second upper and lower teeth or protrusions 302, 304 between which the solid portions of the template plate, rack, or sheet were accommodated, the third embodiment flexible ring 400 has, as can best be seen in FIG. 12, a substantially constant thickness dimension T of approximately two-tenths of an inch (0.188") throughout its entire circumferential extent and throughout its axial height extent H except for four equally spaced, rectangularly configured substantially flat or planar regions 420 which are defined within external surface portions of the flexible ring 400 so as to accommodate solid portions of the template plate, rack, or sheet. It is also seen that the interior peripheral surface portion of the flexible ring 400 is provided with an annular scribe line 410, similar to the scribe line 310 of the second embodiment flexible ring 300, so as to assist operator personnel, when filling the aforenoted food cavities or molds with food product to be cooked, such that the proper amount of food product can be poured into the food cavities or molds in order to obtain the desirable proper end use cooked food product. Still yet further, a second embodiment cooking station 500 is illustrated within FIG. 16, it being noted that component parts of the second embodiment cooking station 500, which correspond to similar parts of the first embodiment cooking station 200 are designated by corresponding reference characters except that they are within the 500 series. Accordingly, it is seen that the second embodiment cooking station uses the third embodiment flexible ring 400 therein, and wherein further, in a manner similar to the first embodiment cooking station 200 as illustrated within FIG. 4, the template plate, rack, or sheet 506, containing the third embodiment flexible rings 400 therein, has been moved to its raised position thereby leaving end cooked food products 509 upon the cooking station hot plate, platen, or griddle 504.

Thus, it may be seen that in accordance with the teachings and principles of the present invention, there has been provided a new and improved cooking station which has operatively associated therewith a plurality of food cooking template racks, plates, or sheets which have hollow or open regions defining different predeterminedly fixed shapes or configurations integrally incorporated or formed therein. A flexible ring is provided for use in conjunction with any one of the plurality of food cooking template racks, plates, or sheets. As a result of the flexibility of the flexible ring, which is a function of the material from which the flexible ring is fabricated, the flexible ring will conform to the periphery of the interior wall portions of the particular template rack, plate, or sheet having the hollow or open regions defined therein. In addition, the solid portions of the template rack, plate, or sheet will effectively be seated within circumferentially extending grooves or tracks, or within circumferentially spaced rectangularly shaped substantially flat or planar regions of the flexible ring. It is to be noted that the weight of the template rack, plate, or sheet, effectively bearing upon the flexible ring as a result of its trapped confinement within the circumferential track or groove of the flexible ring, effectively forces the lower edge portion of the flexible ring into sealing contact with the underlying hot plate, platen, or griddle portion of the cooking station upon which the egg product or pancake batter is cooked. In this manner, the lower edge portion of the flexible ring effectively defines a fluid-tight seal with the underlying hot plate, platen, or griddle of the cooking station such that the eggs or pancake batter cannot leave or escape from the hollow or open regions of the template plate or sheet, while substantially the entire axially extending and upstanding internal peripheral wall structure of the flexible ring serves to confine the eggs or pancake batter and thereby shape or configure the end use cooked food product. In this manner, it can be readily appreciated further that a single flexible ring can be interchangeably utilized with a plurality of different template racks, plates, or sheets, having predetermined differently shaped open or hollow regions formed therein, upon a single food cooking station, so as achieve end use cooked food products having different predeterminedly desired shapes or configurations.

Obviously, many variations and modifications of the present invention are possible in light of the above teachings. It is therefore to be understood that within the scope of the appended claims, the present invention may be practiced otherwise than as specifically described herein.

NUMBER KEY GUIDE

100—first embodiment flexible ring
102—first upper set of circumferentially extending teeth or protrusions of 100
104—second lower set of circumferentially extending teeth or protrusions
106—spaces defined between pairs of adjacent teeth 102, 104
108—annular groove or track circumferentially extending around ring 100
110—first template stamping
112—second template stamping
200—cooking station
202—base of cooking station 200
204—hot plate, platen, or griddle of cooking station 200

206—template rack, plate, or sheet of cooking station 2006
208—hinge/pivot structure mounting template rack 206 on cooking station
209—end use cooked food items
210—handle of template rack 206
212—cover of cooking station 200
214—hinge/pivot structure for cover 212
216—water trough defined within cover 212
218—water seep holes defined within trough 216
300—second embodiment flexible ring
302—first upper set of teeth/protrusions upon ring 300
304—second lower set of teeth/protrusions upon ring 300
306—spaces between adjacent pairs of teeth/protrusions 302/304
308—annular groove/track defined between teeth/protrusions 302/304
310—annular scribe line defined upon internal wall of flexible ring 300
400—third embodiment flexible ring
420—flattened or planar rectangular regions of flexible ring 400
500—second embodiment cooking station
504—hot plate, platen, or griddle of cooking station 500
506—template rack, plate, or sheet of cooking station 2006
510—handle of template rack 506
512—cover of cooking station 500

What is claimed as new and desired to be protected by Letters Patent of the United States of America, is:

1. A cooking assembly for use within a cooking station, comprising:
   a unitary template having a plurality of through-openings defined therein, wherein said plurality of through-openings defined within said template have internal peripheral surface portions which have first predetermined cross-sectional con-figurations; and
   a plurality of flexible rings, each having an external peripheral surface portion which has a second predetermined cross-sectional configuration which is different from said first predetermined cross-sectional configuration of said plurality of through-openings defined within said template, respectively disposed within said plurality of through-openings of said template such that once said plurality of flexible rings, having said second predetermined cross-sectional configurations which are different from said first predetermined cross-sectional configurations of said plurality of through-openings defined within said template, are respectively disposed within said plurality of through-openings of said template having said first predetermined cross-sectional configurations, said plurality of flexible rings, will be deformed from said second predetermined cross-sectional configurations originally characteristic of said plurality of flexible rings and will conform to said first predetermined cross-sectional configurations of said plurality of through-openings defined within said template and will confine food products to be cooked therewithin such that when the food products, disposed within said plurality of flexible rings which have been disposed within said through-openings defined within said template and which have been conformed to said first predetermined cross-sectional configurations of said plurality of through-openings defined within said template, have been cooked, the cooked food products will have cross-sectional configurations which are substantially as defined by said first predetermined cross-sectional configurations of said plurality of through-openings defined within said template.

2. The cooking assembly as set forth in claim 1, wherein:
said flexible rings are fabricated from polytetrafluoroethylene having stainless steel powder mixed therein.

3. The cooking assembly as set forth in claim 1, wherein:
said flexible rings have a first upper set of teeth or protrusions extending radially outwardly therefrom and circumferentially spaced around external surface portions of said flexible rings; and
said flexible rings have a second lower set of teeth or protrusions extending radially outwardly therefrom and circumferentially spaced around external surface portions of said flexible rings;
said first upper set of teeth or protrusions being axially spaced from said second lower set of teeth or protrusions so as to define an annular groove or track extending circumferentially around said external surface portions of said flexible rings so as to accommodate solid residual portions of said template such that said template is effectively trapped within said annular grooves or tracks of said flexible rings so as to define said cooking assembly with said flexible rings.

4. The cooking assembly as set forth in claim 3, wherein:
said first upper set of teeth or protrusions, and said second lower set of teeth or protrusions, of said flexible rings each comprise thirty (30) teeth or protrusions, wherein each one of said teeth or protrusions encompasses an angular extent of approximately six degrees (6°) while spaces, defined between adjacent pairs of said first upper or second lower teeth or protrusions, also encompass angular extents of approximately six degrees (6°).

5. The cooking assembly as set forth in claim 3, wherein:
said first upper set of teeth or protrusions, and said second lower set of teeth or protrusions, of said flexible rings each comprise twenty (20) teeth or protrusions, wherein each one of said teeth or protrusions encompasses an angular extent of approximately six degrees (6°) while spaces, defined between adjacent pairs of said first upper or second lower teeth or protrusions, encompass angular extents of approximately twelve degrees (12°).

6. The cooking assembly as set forth in claim 1, wherein:
a scribe line is visibly marked upon an annular internal circumferentially extending wall portion of each one of said flexible rings so as to assist operator personnel in determining the optimal amount of uncooked food product to be inserted into each one of said flexible rings.

7. The cooking assembly as set forth in claim 1, wherein:
said predetermined cross-sectional configurations of said through-openings of said template is selected from the group comprising a circle, a square, a rectangle, an ellipse, a triangle, and a diamond.

8. The cooking assembly as set forth in claim 1, wherein:
a plurality of flattened planar regions are defined within external peripheral surface portions of each one of said flexible rings for accommodating solid residual portions of said template such that said template is effectively trapped within said plurality of flattened planar regions of each one of said flexible rings so as to define said cooking assembly with said plurality of flexible rings.

9. A cooking station, comprising:
a framework;
a hot plate, platen, or griddle, upon which food products are cooked, fixedly mounted upon said framework; and
a cooking assembly for use within said cooking station comprising:

a unitary template rack, plate, or sheet, pivotally mounted upon said framework so as to be movable between lowered and raised positions, and having a plurality of through-openings defined therein, wherein said plurality of through-openings defined within said template have internal peripheral surface portions which have first predetermined cross-sectional configurations; and a plurality of flexible rings, each having an external peripheral surface portion which has a second predetermined cross-sectional configuration which is different from said first predetermined cross-sectional configuration of said plurality of through-openings defined within said template, respectively disposed within said plurality of through-openings of said template such that once said plurality of flexible rings, having said second predetermined cross-sectional configurations which are different from said first predetermined cross-sectional configurations of said plurality of through-openings defined within said template, are respectively disposed within said plurality of through-openings of said template having said first predetermined cross-sectional configurations, said plurality of flexible rings, will be deformed from said second predetermined cross-sectional configurations originally characteristic of said plurality of flexible rings and will conform to said first predetermined cross-sectional configurations of said plurality of through-openings defined within said template and will confine food products to be cooked therewithin such that when the food products, disposed within said plurality of flexible rings which have been disposed within said through-openings defined within said template and which have been completely conformed to said first predetermined cross-sectional configurations of said plurality of through-openings defined within said template, have been cooked, the cooked food products will have cross-sectional configurations which are substantially as defined by said first predetermined cross-sectional configurations of said plurality of through-openings defined within said template.

10. The cooking station as set forth in claim 9, wherein: said flexible rings are fabricated from polytetrafluoroethylene having stainless steel powder mixed therein.

11. The cooking station as set forth in claim 9, wherein: said flexible rings have a first upper set of teeth or protrusions extending radially outwardly therefrom and circumferentially spaced around external surface portions of said flexible rings; and said flexible rings have a second lower set of teeth or protrusions extending radially outwardly therefrom and circumferentially spaced around external surface portions of said flexible rings;

said first upper set of teeth or protrusions being axially spaced from said second lower set of teeth or protrusions so as to define annular grooves or tracks extending circumferentially around said external surface portions of said flexible rings so as to accommodate solid residual portions of said template rack, plate, or sheet such that said template rack, plate, or sheet is effectively trapped within said annular grooves or tracks of said flexible rings so as to define a cooking assembly with said flexible rings.

12. The cooking station as set forth in claim 11, wherein: said first upper set of teeth or protrusions, and said second lower set of teeth or protrusions, of said flexible rings each comprise thirty (30) teeth or protrusions, wherein each one of said teeth or protrusions encompasses an angular extent of approximately six degrees (6°) while spaces, defined between adjacent pairs of said first upper or second lower teeth or protrusions, also encompass angular extents of approximately six degrees (6°).

13. The cooking station as set forth in claim 11, wherein: said first upper set of teeth or protrusions, and said second lower set of teeth or protrusions, of said flexible rings each comprise twenty (20) teeth or protrusions, wherein each one of said teeth or protrusions encompasses an angular extent of approximately six degrees (6°) while spaces, defined between adjacent pairs of said first upper or second lower teeth or protrusions, encompass angular extents of approximately twelve degrees (12°).

14. The cooking station as set forth in claim 9, wherein: a scribe line is visibly marked upon an annular internal circumferentially extending wall portion of each one of said flexible ring so as to assist operator personnel in determining the optimal amount of uncooked food product to be inserted into said flexible rings.

15. The cooking station as set forth in claim 9, wherein: said predetermined cross-sectional configurations of said through-openings of said template is selected from the group comprising a circle, a square, a rectangle, an ellipse, a triangle, and a diamond.

16. The cooking station as set forth in claim 9, wherein: a plurality of flattened planar regions are defined within external peripheral surface portions of said flexible rings for accommodating solid residual portions of said template such that said template is effectively trapped within said plurality of flattened planar regions of said flexible ring so as to define said cooking assembly with said flexible rings.

17. The cooking station as set forth in claim 9, wherein: said template rack, plate, or sheet is provided with a handle for facilitating pivotal movement of said template rack, plate, or sheet between raised and lowered positions.

18. The cooking station as set forth in claim 9, wherein: said template rack, plate, or sheet, comprising said through-openings having said predetermined cross-sectional configurations defined therein, is removable from said cooking station so as to be interchangeable with other template racks, plates, or sheets comprising through-openings having different predetermined cross-sectional configurations formed therein.

19. The cooking station as set forth in claim 9, further comprising:
a water trough defined within a cover of said cooking station; and weep or seep holes defined within said water trough such that when a predetermined amount of water is deposited within said water trough, water droplets can seep out through said weep or seep holes and enter the internal environment of said cooking station whereby said water droplets will effectively be converted into steam so as to facilitate the cooking of the upper portions of the food products being cooked.

* * * * *